(12) United States Patent  (10) Patent No.: US 9,114,579 B2
Lanciaux  (45) Date of Patent: Aug. 25, 2015

(54) HEAT BRAKE

(71) Applicant: Fran Lanciaux, Grand Rapids, OH (US)

(72) Inventor: Fran Lanciaux, Grand Rapids, OH (US)

( * ) Notice: Subject to any disclaimer, the term of this patent is extended or adjusted under 35 U.S.C. 154(b) by 0 days.

(21) Appl. No.: 13/999,680

(22) Filed: Mar. 17, 2014

(65) Prior Publication Data

US 2014/0271972 A1    Sep. 18, 2014

Related U.S. Application Data

(60) Provisional application No. 61/852,240, filed on Mar. 15, 2013.

(51) Int. Cl.
  *B29D 23/00*   (2006.01)
  *B32B 1/08*    (2006.01)
  *B29C 53/04*   (2006.01)
  *B29C 53/38*   (2006.01)
  *B29C 53/40*   (2006.01)

(52) U.S. Cl.
  CPC .............. *B29D 23/001* (2013.01); *B29C 53/04* (2013.01); *B32B 1/08* (2013.01); *B29C 53/382* (2013.01); *B29C 53/40* (2013.01); *Y10T 156/1036* (2015.01)

(58) Field of Classification Search
  USPC ........................................................ 425/388
  See application file for complete search history.

(56) References Cited

U.S. PATENT DOCUMENTS

| | | | |
|---|---|---|---|
| 1,916,908 A | | 7/1933 | Stacey, Jr. et al. |
| 2,493,439 A | * | 1/1950 | Braund .................... 264/552 |
| 3,212,529 A | | 10/1965 | Ullman et al. |
| 3,251,382 A | | 5/1966 | Tatsch |
| 3,787,158 A | * | 1/1974 | Brown et al. ............... 425/156 |
| 5,918,644 A | | 7/1999 | Haack et al. |
| 5,944,060 A | | 8/1999 | MacKay |
| 6,360,783 B2 | | 3/2002 | Faverio, IV et al. |
| 6,716,520 B2 | | 4/2004 | Cook, II |
| 6,717,520 B1 | | 4/2004 | Dorenbosch |
| 6,763,853 B1 | | 7/2004 | Redding et al. |
| 2006/0083889 A1 | | 4/2006 | Schuckers |
| 2011/0030833 A1 | | 2/2011 | Griggio |

\* cited by examiner

*Primary Examiner* — Joseph S Del Sole
*Assistant Examiner* — John Robitaille
(74) *Attorney, Agent, or Firm* — David C Purdue

(57) ABSTRACT

A heat brake for heating and softening a thermoplastic sheet for bending is disclosed. The heat brake has a split work piece support table having two edges defining a slot between adjacent portions of the table. A first plenum is provided below the split work support table. During operation, the first plenum has a negative pressure. Air is drawn into the first plenum through the slot when a work piece does not span the slot. When a work piece spans the slot, the flow of air into the first plenum is reduced. The heat brake has a tube heater with an outlet nozzle positioned in the first plenum. A portion of the tube heater is positioned in a second plenum which is pressurized during heating. Air is moved from the second plenum through the heater tube and is directed against a work piece supported on the table.

11 Claims, 5 Drawing Sheets

HEAT BRAKE

BACKGROUND OF THE INVENTION

1. Field of the Invention

The invention concerns the field of heat brakes for bending thermoplastic sheets clad ducts for HVAC applications, and to methods and machines for producing clad ducts.

2. Description of the State of the Art

During a search for patents related to the present invention, published U.S. Patent application Nos. 20110030833 and 20060083889 were noted. In addition, the following were noted U.S. Pat. Nos. 7,712,787, 6,763,853, 6,716,520, 6,360,783, 5,944,060, 5,918,644, 3,251,382, 3,212,529, and 1,916,908.

The integrity of ductwork is a major concern for the HVAC industry and also for building owners. When the integrity of ductwork is compromised, the consequences range from increased energy costs to contamination of air supplied to a building. The integrity of outdoor ductwork is of particular concern because it is exposed to the elements and must withstand much harsher conditions than indoor ductwork. For decades, outdoor ductwork has been clad with sheet metal to protect it from the elements but the results have been disappointing. Corrosion, leaks and contamination have plagued outdoor ductwork clad with sheet metal. There is a tremendous need for clad ductwork that has good R value and that will maintain its integrity for extended periods of time, especially outdoors. In meeting this need, consideration must be given to many things including manufacturing costs, installation costs, performance, and durability.

It is an object of the invention to provide a heat brake especially suited for heating a sheet of thermoplastic material.

It is a further object of the invention to provide a heat brake especially suited for producing a clad duct from a laminate comprising a sheet of thermoplastic material bonded to a sheet of foam.

It is a further object of the invention to provide a heat brake with a plenum operable to maintain a negative pressure for drawing cooling air through a slot in a split work support table.

It is a further object of the invention to provide a heat brake with a second plenum that can be selectively pressurized to direct heating air towards a specific portion of a thermoplastic sheet.

It is a further object of the invention to provide a heat brake that is operable to sequentially heat portions of a thermoplastic sheet in rapid succession.

These and other objects and advantages of the present invention shall be apparent from the following detailed description with reference, therein, to the several drawing figures.

DETAILED DESCRIPTION OF REPRESENTATIVE EMBODIMENTS OF THE INVENTION

Figure 1:
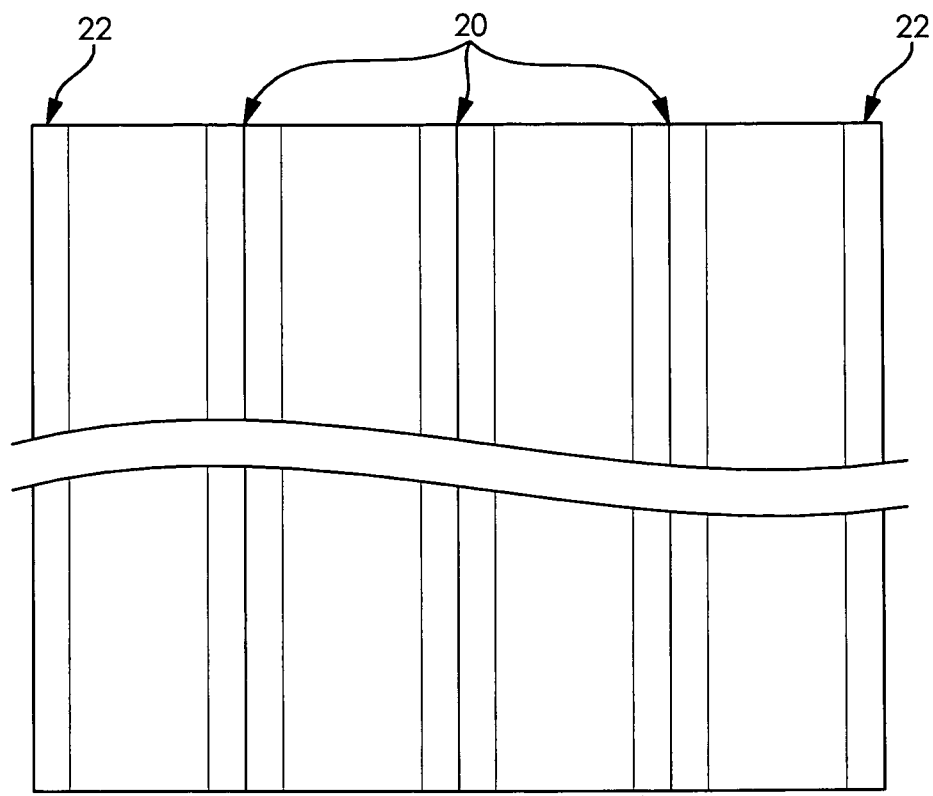
FIG. 1 is a plan view of duct board with four panels defined by three channels cut into the ductboard for forming a four sided clad duct according to the invention.
Figure 2:
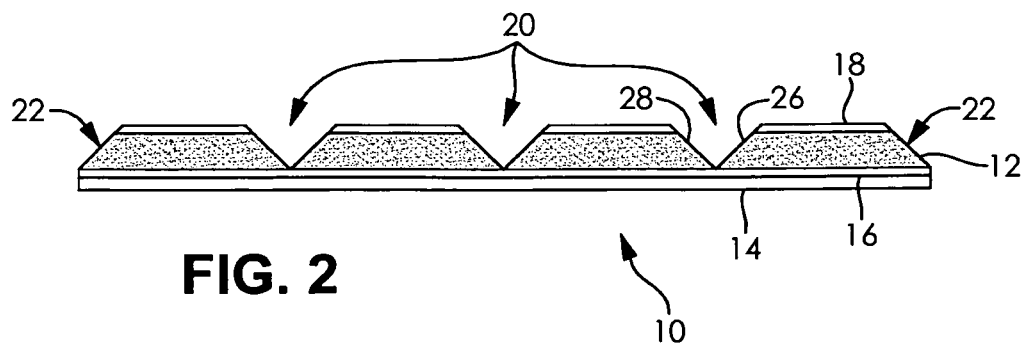
FIG. 2 is an end view of the duct board shown in FIG. 1.

Referring now to FIGS. 1 and 2, duct board according to the present invention is indicated generally at 10. The duct board 10 is a laminate comprising more than one material. The board 10 comprises a layer of foam insulation panel 12 and a sheet of thermoplastic polymer 14. The sheet 14 may have any one of a range of thicknesses. For example, a range of 0.3 mm to 2.0 mm is suitable. A preferred thickness range is 0.6 mm to 1.7 mm. A thickness of 1.0 mm is especially preferred for use with the foam panels specifically disclosed and described below.

The foam panel 12 may be faced with facing sheets 16 and 18. The facing may be scrimmed aluminum foil or any other acceptable facing material. Excellent results have been obtained where the foam insulation panel 12 is one that is available from Kingspan under the trademark KoolDuct®. It is a rigid phenolic insulation panel that has a rigid phenolic insulation core with zero Ozone Depletion Potential (ODP), autohesively bonded on both sides to a 1 mil low vapor permeability aluminum foil facing reinforced with a 0.2" glass scrim. KoolDuct rigid phenolic insulation panels are available in thicknesses of ⅞", 1 3/16" and 1 5/16". KoolDuct panels are approximately four feet wide and come in lengths of ten feet and thirteen feet. It has a high R value, excellent fire and heat resistance properties, and it is a closed cell foam. KoolDuct is distributed with foil facing layers.

The sheet 14 is made from a thermoplastic material and good results have been obtained using PVC thermoplastic sheet material. In a finished duct, the sheet 14 will be on the outside and so the material should be selected for this type of service. It is preferred that it contain additives to prolong its service life. For example, lithium oxide may be added to improve resistance to degradation caused by ultraviolet radiation. The sheet 14 is securely bonded to the foam insulation panel. Excellent results have been obtained with polyurethane adhesive systems. In any case, a strong and secure bond is required between the panel 12 and the sheet 14.

Three V-shaped grooves indicated at 20 have been cut in the duct board to form faces that form an angle of approximately 90 degrees. The edges 22 of the duct board 10 have been chamfered to an angle of approximately 45 degrees. It will be appreciated that the grooved duct board 10 will produce a four sided duct. In order to produce a duct with more or less than four sides, more or less than three grooves may be cut. It will also be appreciated that, with more or less than three grooves, the angle of the V-shaped cuts and the angle of the chamfers will be modified accordingly.

Figure 3:
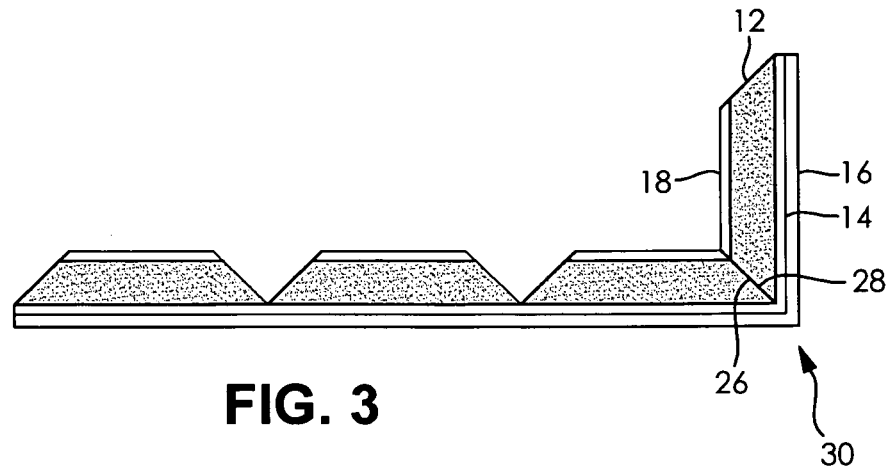
FIG. 3 is an end view of the duct board shown in FIG. 2 after the board has been folded along a first channel.
Figure 4:
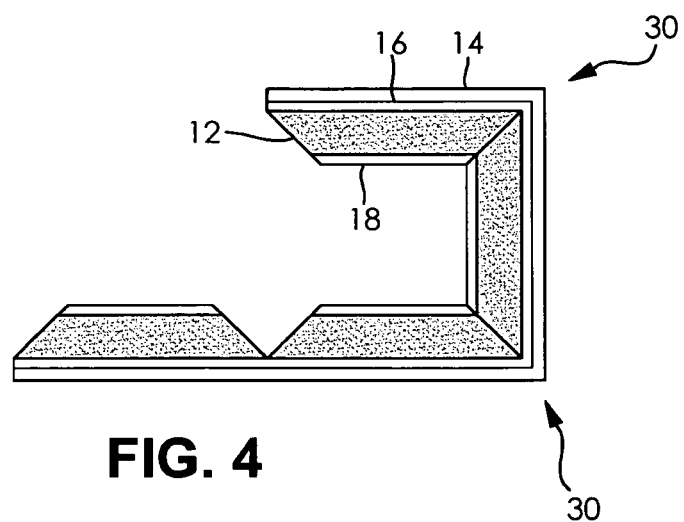
FIG. 4 is an end view of the duct board shown in FIG. 3 after it has been folded along a second channel.
Figure 5:
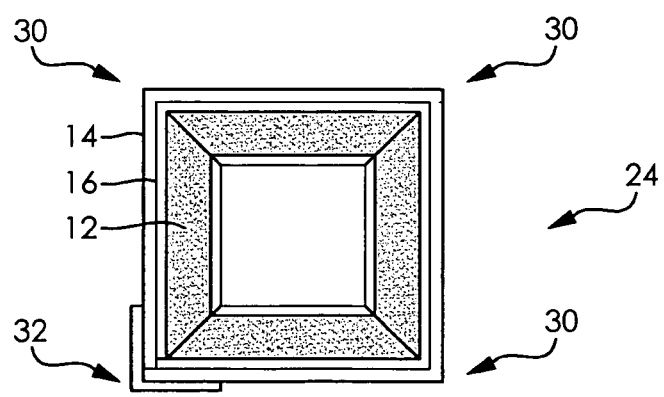
FIG. 5 is an end view of the duct board shown in FIG. 4 after it has been folded along a third channel to produce a duct preform.

In order to form a duct from the duct board 10, it must first be folded three times, as shown in a progression illustrated in FIGS. 3, 4, and 5, to produce the duct shaped structure 24 shown in FIG. 5. However, the thermoplastic polymer sheet 14 is inflexible and inelastic at room temperature and, because it is bonded to the foam panel 12, it prevents the duct board 10 from being folded. The folding process requires that the sheet 14 be heated first so that it may be thermoformed. The application of heat softens the sheet 14 rendering it pliable. It is preferred to heat the sheet 14 from the side opposite the foam panel 12 and to heat it only in the region adjacent to the bottom of the V-shaped grooves 20. This process is broadly referred to as line bending which involves heating a thermoplastic material until it becomes soft and pliable, i.e., it loses its elastic memory. Once the material has become pliable, it is bent to a desired shape, usually over a former. The material is allowed to cool and, when cool, it retains the shape that it had before it cooled. This process is used to great advantage in the context of folding laminated ductboard. The foam core of KoolDuct panels is a rigid foam. When the V-shaped grooves are cut carefully and precisely and the angles are carefully controlled, no jig or former is required to produce uniform, consistent bends.

When the V-shaped grooves 20 are cut, two surfaces 24 and 26 (FIG. 2) are produced in the rigid foam panel 12. When the sheet 14 is heated and bent, the surfaces 24 and 26 come together and, when the surfaces 24 and 26 are in full contact with each other, further bending is suddenly and forcefully resisted. At that point, the application of heat is stopped and the sheet is allowed to cool until it retains the desired shape which, in the case of the process shown in FIGS. 3 through 5, is a ninety degree bend indicated at 28 in FIGS. 3 through 5. Thus, the nature of the laminated duct board makes it a perfect material to use in this process. As mentioned above, success depends upon precise groove cutting. The angles and the depths of the cuts must be consistent and reproducible and this is easily achieved with a machine sold under the trademark KD3Z® which is available from GoMech, Ltd. The KD3Z machine is a computer controlled CNC system for precisely and consistently cutting foam insulating panels and, especially, KoolDuct.

Figure 6:
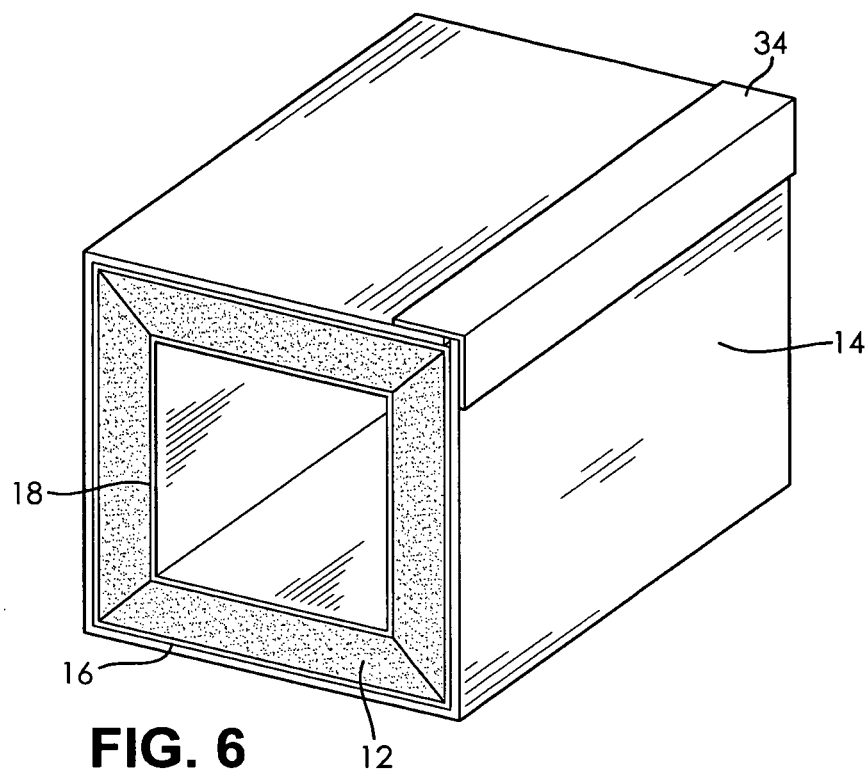
FIG. 6 is a perspective view of a duct section formed from the duct preform shown in FIG. 5 where the seam created where two edges of the duct board meet has been sealed according to a first method.
Figure 7:
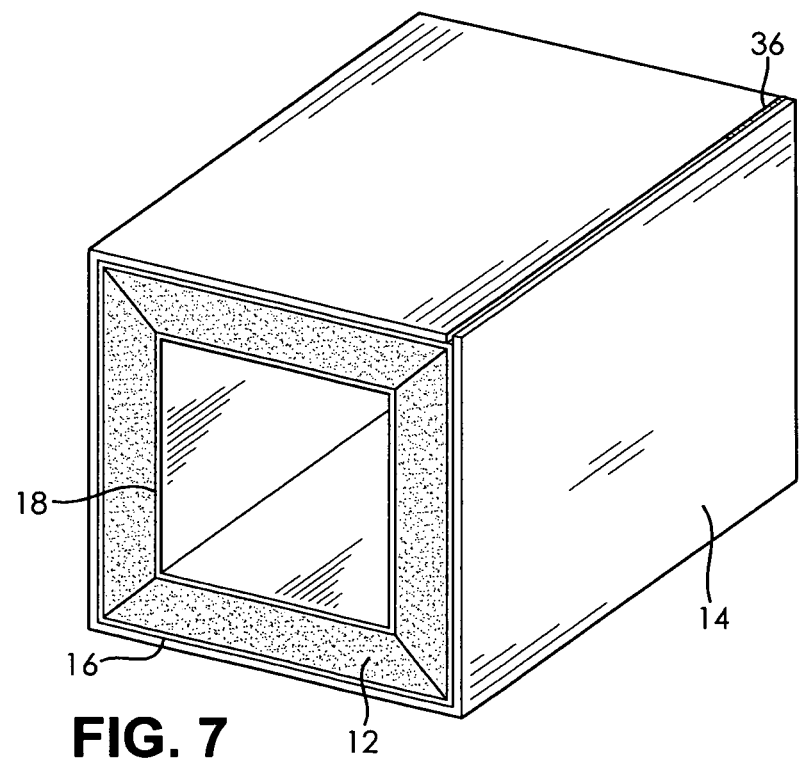
FIG. 7 is a perspective view of a duct section formed from the duct preform shown in FIG. 5 where the seam created where two edges of the duct board meet has been sealed according to a second method.

The duct shaped structure 24 shown in FIG. 5 has a raw edge 32 where the two side edges of the duct board 10 come together. This edge 32 should be sealed and this can be done in a variety of ways. A preferred seal is shown in FIG. 6. The raw edge is sealed with a thermoplastic right angle strip 34 which is, preferably, the same composition as the sheet 14. The right angle strip is bonded to the sheet 14 to close the raw edge and seal it against the elements. Another preferred seal is shown in FIG. 7 where the two raw edges have been welded together, as indicated at 36 using a rod made of thermoplastic polymer which, again, is preferably the same composition as the sheet 14. Alternatively, a seal can be made with caulk or other filler material.

The duct sections illustrated in FIGS. 6 and 7 can be joined together with conventional connectors to produce ducts of a desired length. Kingspan offers three connector systems, namely, the tiger connector system, the 4-bolt flange system and the aluminum grip flange system. Other connectors may be employed. A good leak free weatherproof connection between duct sections is very important lest it become the weakest link in the duct.

Figure 8:
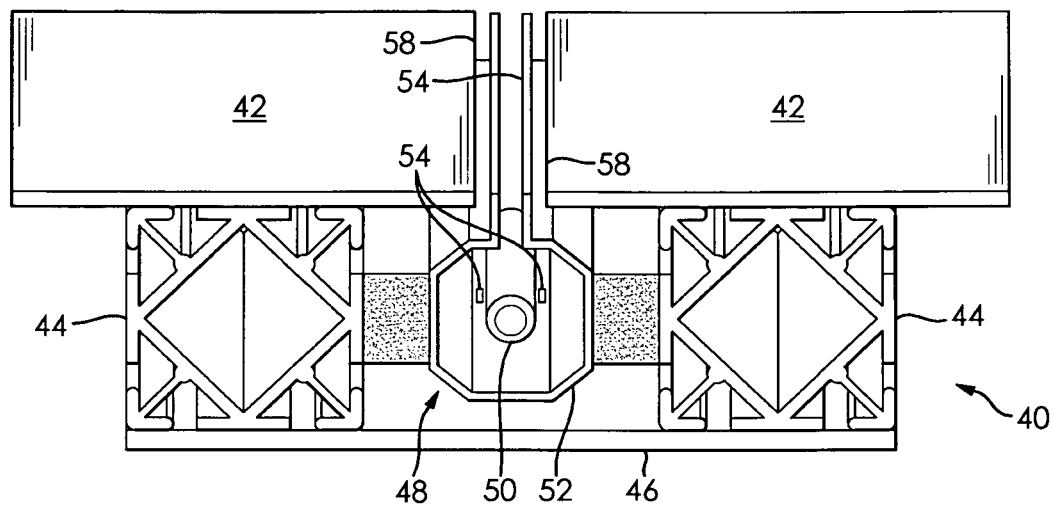
FIG. 8 is a top end perspective view showing some of the details of a heat brake useful for bending duct board according to the invention.
Figure 9:
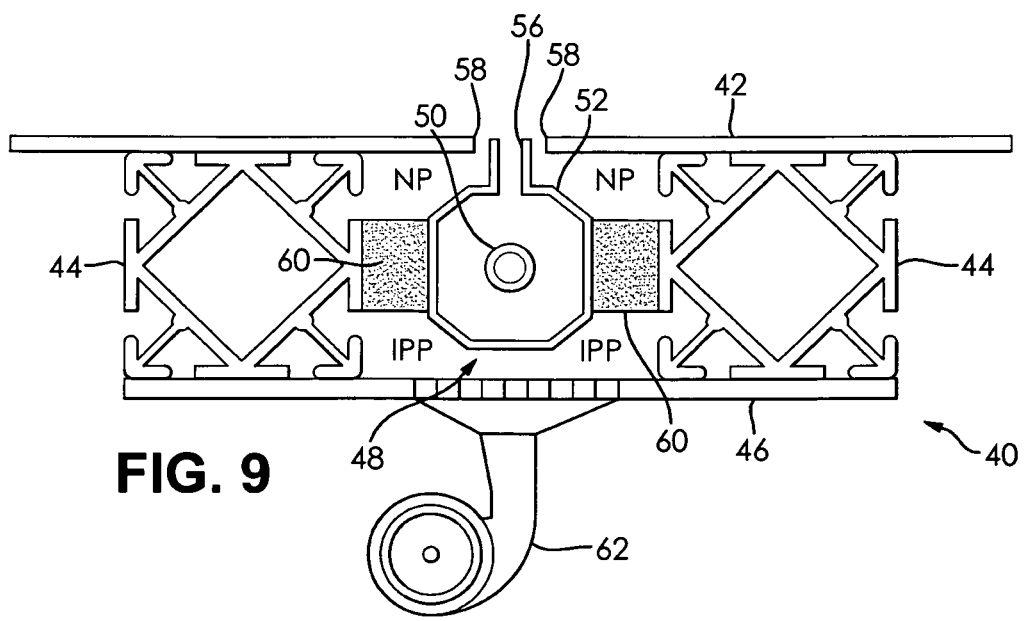
FIG. 9 is an end view of the heat brake shown in FIG. 8.

In FIGS. 8 and 9, a heat brake or line bender is indicated generally at 40. The heat brake 40 comprises a split work support table 42 which is supported on beams 44 which, in this example, are channeled aluminum extrusions. The beams 44 are supported on a base 46 which may, in turn, be supported on legs (not shown). An insulated quartz tube heater 48 is supported in between the beams 44. The quartz tube heater 48 comprises quartz lamps 50 inside of an insulated housing tube 52. Air enters the tube 52 through inlets 54 on the bottom of the tube 52. The air is heated in the tube 52 and heated air exits the tube 52 through a linearly extending nozzle opening 56 that directs heated air upwardly between two edges 58 of the split work support table 42. Spacer blocks 60 extend between the beams 44 and the insulated housing tube 52 defining a negative pressure plenum indicated by NP above the spacer blocks 60 and an intermittently pressurized plenum indicated by IPP below the spacer blocks. A convection blower 62 operates intermittently, on-demand, to pressurize the intermittently pressurized plenum IPP which causes air to flow into the tube 52 through inlets 54. The heated air flows upwardly and out of the nozzle 56. A fan 64 (FIGS. 10 and 11) withdraws air from the negative pressure plenum NP causing ambient air to flow downwardly, between the nozzle 56 and the edges 58 of the work support table 42. This air flow provides cooling for the work support table 42 and adjacent parts of the line bender 40. The heat brake 40 may be operated in the manner described below with reference to FIGS. 10 and 11 which are schematic representations of the heat brake 40.

Figure 10:
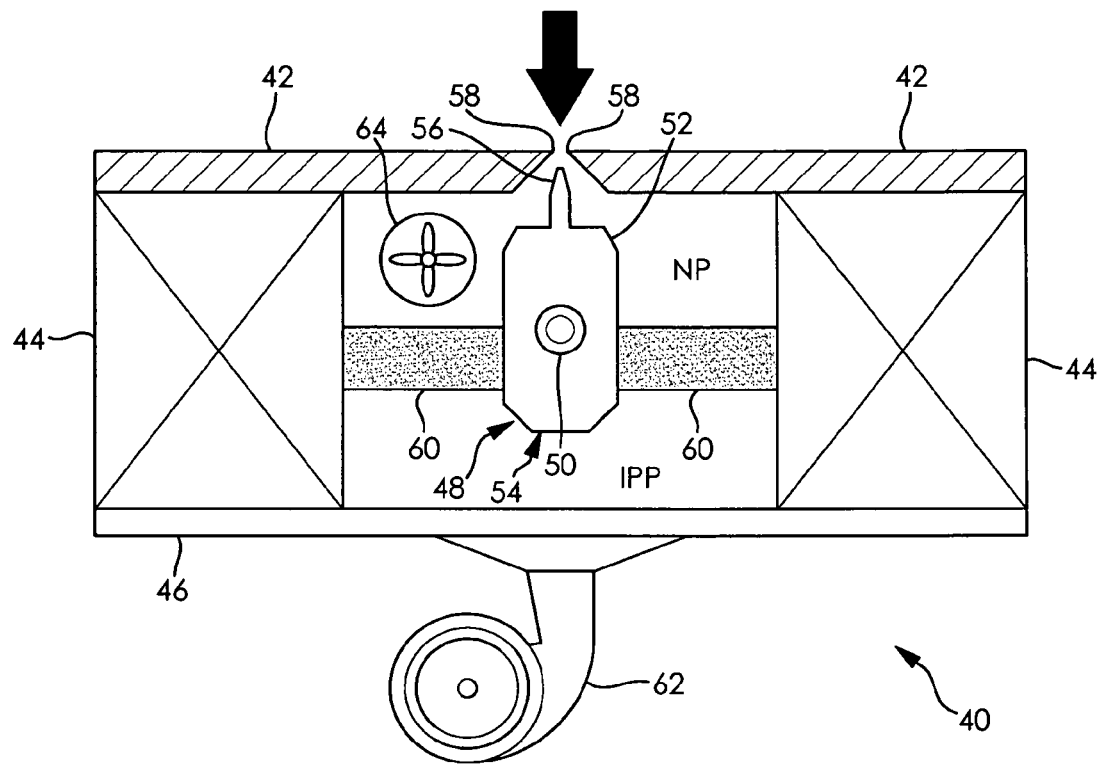
FIG. 10 is an end view showing air flow in the heat brake when it is in a stand-by mode.

The heat brake 40 is shown in FIG. 10 in idle or stand-by mode. There is no duct board 10 on the work support table. The fan 64 is withdrawing air from the negative pressure plenum NP and make up air is entering that plenum through the openings between the nozzle 56 and the edges 58 of the work support table, as indicated by the large arrow. This cools the work support table 42 and adjacent parts of the heat brake 40. The convection blower 62 is off and the intermittently pressurized plenum IPP is not pressurized.

Figure 11:
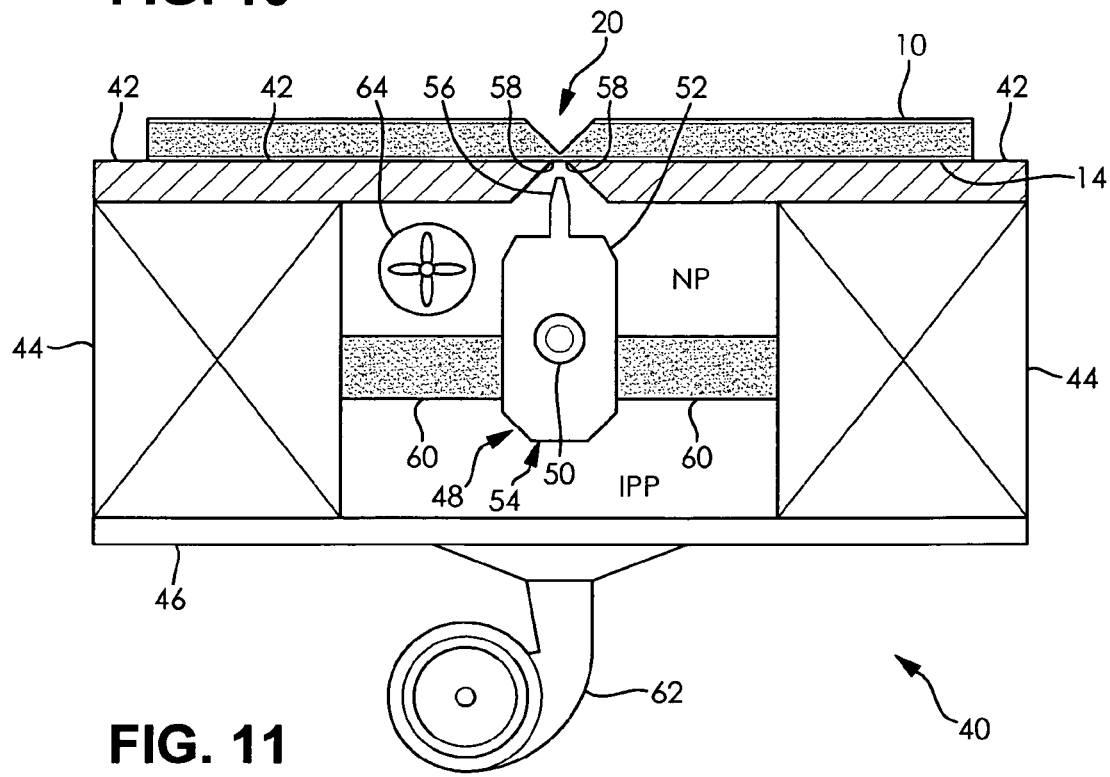
FIG. 11 is an end view showing air flow in the heat brake when it is in bending mode.

In FIG. 11, a piece of ductboard 10 is positioned on the work support table 42. The exhaust fan 64 may continue to run but the air inlet to the negative pressure plenum NP, the gap between the edges 58 of the work support table 42, has been closed by the duct board 10. As a consequence, the work support table 42 is not being cooled. The convection blower 62 is energized causing the intermittently pressurized plenum IPP to become pressurized. Pressure in the plenum IPP causes air to flow into the quartz tube heater 48 where it is heated by the quartz lamps 50. Heated air is then exhausted from the tube 52 through the nozzle 58 which directs it towards the duct board 10. The heated air strikes the thermoplastic sheet 14 along a line that is coincident with the groove 20 in the duct board 10. The heated air warms the thermoplastic sheet until it becomes pliable at which time an operator bends or folds the duct board 10 along the groove 20 forming a ninety degree angle in the case of a duct board that has been grooved to make a four sided panel. The bent edge of the duct board is moved away from the nozzle 56 and held in the bent position until the thermoplastic sheet has cooled enough to retain its shape. If the duct board 10 requires additional bending, the next groove is positioned over the nozzle and the process is repeated until a duct shaped structure (24 in FIG. 5) has been produced. The duct shaped structure is then removed from the work support table 42. When the structure 24 is removed from the table, the flow of cooling air into and through the negative pressure plenum NP resumes. The convection blower can be de-energized and remain de-energized until the next piece of duct board 10 is positioned on the work support table 42 and the cycle can be repeated.

It will be apparent to those skilled in the art that the inventions are subject to modifications within the limits of the knowledge of a person of ordinary skill in the art without departing from the scope or spirit of the invention.

I claim:

1. A heat brake comprising
   a split work piece support table having two edges defining a slot between adjacent portions of said split work piece support table,
   a first plenum below said split work piece support table,
   a first blower for creating a negative pressure within said first plenum,
   a second plenum below said split work piece support table and below said first plenum,
   a second blower for creating a positive pressure within said second plenum,
   at least one nozzle operable to conduct air from said second plenum through said first plenum towards said slot, and
   a heater between said second blower and said at least one nozzle,
   wherein said first plenum is in communication with said slot,
   wherein said first blower is operable to cause air to flow through said slot and into said first plenum, and
   wherein said second blower is operable to cause air to flow into said second plenum and out of said second plenum and through said at least one nozzle.

2. The heat brake claimed in claim 1 wherein said heater is in a tube that is between said second plenum and said at least one nozzle.

3. The heat brake claimed in claim 2 wherein said tube has openings that provide communication between the interior of said tube and said second plenum and wherein the interior of said tube is in communication with said at least one nozzle.

4. The heat brake claimed in claim 1 wherein said second blower is powered by a controller that is operable to selectively pressurize said second plenum.

5. The heat brake claimed in claim 2 wherein said second blower is powered by a controller that is operable to selectively pressurize said second plenum.

6. The heat brake claimed in claim 3 wherein said second blower is powered by a controller that is operable to selectively pressurize said second plenum.

7. The heat brake claimed in claim 1 wherein said heater is a quartz heater in a rube.

8. The heat brake claimed in claim 7 wherein said at least one nozzle is supported on said tube and wherein said second plenum is in communication with said at least one nozzle through said tube.

9. A heat brake comprising
   a split work piece support table having two edges defining a slot between adjacent portions of said split work piece support table,
   a first plenum below said split work piece support table,
   a first blower for creating a negative pressure within said first plenum,
   a second plenum below said split work piece support table and below said first plenum,
   a second blower for creating a positive pressure within said second plenum,
   at least one nozzle operable to conduct air from said second plenum through said first plenum towards said slot,
   a tube having openings that provide communication between said second plenum and said at least one nozzle, and
   a heater in said tube,
   wherein said first plenum is in communication with said slot,
   wherein said first blower is operable to cause air to flow through said slot and into said first plenum, and
   wherein said second blower is operable to cause air to flow into said second plenum, through said tube, and through said at least one nozzle.

10. The heat brake claimed in claim 9 wherein said heater is quartz heater.

11. The heat brake claimed in claim 9 wherein said second blower is powered by a controller that is operable to selectively pressurize said second plenum.

* * * * *